United States Patent
Yoshizawa et al.

(10) Patent No.: US 6,785,601 B2
(45) Date of Patent: Aug. 31, 2004

(54) AIR-FUEL RATIO CONTROL APPARATUS OF INTERNAL COMBUSTION ENGINE AND METHOD THEREOF

(75) Inventors: Hidekazu Yoshizawa, Atsugi (JP); Hajime Hosoya, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 76 days.

(21) Appl. No.: 10/320,657

(22) Filed: Dec. 17, 2002

(65) Prior Publication Data

US 2003/0114979 A1 Jun. 19, 2003

(30) Foreign Application Priority Data

Dec. 18, 2001 (JP) ........................................ 2001-384053
Dec. 28, 2001 (JP) ........................................ 2001-401918

(51) Int. Cl.[7] ............................................. F02D 41/14
(52) U.S. Cl. ...................................... 701/109; 123/674
(58) Field of Search .................................. 701/109, 103, 701/104, 672, 674, 703

(56) References Cited

U.S. PATENT DOCUMENTS

| 6,591,822 B2 | * | 7/2003 | Dohta | ..................... 123/672 |
| 2002/0173901 A1 | * | 11/2002 | Yoshizawa | ................. 701/109 |
| 2003/0101975 A1 | * | 6/2003 | Yoshizawa et al. | ......... 123/674 |

FOREIGN PATENT DOCUMENTS

| JP | 2001-164971 A | | 6/2001 | |
| JP | 2003-172178 A | * | 6/2003 | ........... F02D/41/14 |

* cited by examiner

Primary Examiner—Hieu T. Vo
(74) Attorney, Agent, or Firm—Foley & Lardner LLP

(57) ABSTRACT

The present invention is constituted so that an actual air-fuel ratio is detected by an air-fuel ratio sensor, a plant model representing a plant between a fuel injection valve and the air-fuel ratio sensor is sequentially identified to calculate parameters of the plant model, a control gain for calculating a feedback control amount is calculated using the calculated parameters, and the feedback control amount is calculated using the calculated control gain, wherein an absolute value of an input side parameter set on an input side of the plant model is limited to be a predetermined limit value or above, among the calculated parameters.

24 Claims, 7 Drawing Sheets

AIR-FUEL RATIO CONTROL APPARATUS OF INTERNAL COMBUSTION ENGINE AND METHOD THEREOF

FIELD OF THE INVENTION

The present invention relates to an air-fuel ratio control technology for setting a feedback control amount to feedback control an air-fuel ratio, while calculating a parameter of a plant model representing a plant between a fuel injection valve and an air-fuel ratio sensor by a transfer function.

DESCRIPTION OF THE RELATED ART

Heretofore, in an internal combustion engine, it is common to feedback control an air-fuel ratio to a target value so as to improve the exhaust purification and the fuel efficiency.

There has been disclosed a technique for performing such an air-fuel ratio feedback control with high accuracy (Japanese Unexamined Patent Publication No. 2001-164971), in which a feedback control amount of a fuel injection quantity is calculated by a sliding mode control, while performing a waste time compensation control by a Smith method.

Here, it is possible to adopt a self-tuning control to such a conventional air-fuel ratio feedback control so as to further correspond to a characteristic change of a control object (plant) with high accuracy. In such a case, the feedback control amount is calculated as follows.

A plant model representing a plant between a fuel injection valve and an air-fuel ratio sensor is identified sequentially, to estimate a parameter of the plant model.

Then, using this identified plant model (estimated parameter), the entire system including the plant, a feedback control amount calculating section (in other words, a sliding mode control section) and a waste time compensation control section is represented by one transfer function, and a control gain of the sliding mode control is calculated so that a pole of the transfer function is coincident with a desirable pole from the point of view of response characteristic, overshoot, stabilization period, and so on.

Then, the feedback control amount of the fuel injection quantity is calculated by the sliding mode control utilizing the calculated control gain.

Thus, by adopting the self-tuning method, it becomes possible to perform the air-fuel ratio control corresponding to the characteristic change of the plant with high accuracy. However, there are problems as described below.

(1) The plant can be described by a model as the following equation, for example, $$A(z^{-1})y(t) = z^{-k}B(z^{-1})u(t)$$

$$A(z^{-1}) = 1 + a_1 z^{-1} + a_2 z^{-2}$$

$$B(z^{-1}) = b_0$$

where $u(t)$: plant input, $y(t)$: plant output, and $k$: waste time. Further, since $A(z^{-1})$ is set on the plant output $y(t)$ side, system parameters $a_1$, $a_2$ constituting $A(z^{-1})$ is set as "output side parameters". Since $B(z^{-1})$ is set on the plant input $u(t)$ side, a system parameter $b_0$ constituting $B(z^{-1})$ is set as "input side parameter".

The control gain in the self-tuning control is finally calculated by subtracting a calculation value of the input side parameter $b_0$ (or a steady gain $B(1)$ of $B(z^{-1})$ in the case where $B(z^{-1})$ is $b_0 + b_1 z^{-1} + \ldots + b_n z^{-n}$). Therefore, the smaller an absolute value of the input side parameter $b_0$ (or the steady gain $B(1)$) becomes, the larger each control gain is calculated.

Consequently, if the calculation value of the input side parameter $b_0$ becomes too smaller, each control gain becomes excessive (that is, the control amount becomes also excessive), to cause a possibility of control divergence. Particularly, in the case where an actual waste time included in the plant is larger than a waste time set for identification, there is caused a problem in that the input side parameter $b_0$ is calculated to be smaller.

(2) The waste time compensation control by the Smith method is for predicting, using the feedback control amount, the plant output after the lapse of waste time, that is, the air-fuel ratio after the lapse of waste time, to determine a control input (plant input). However, since an actual fuel injection quantity (control amount to the fuel injection valve) in the air-fuel ratio feedback control is determined by adding a fixed offset correction amount such as a learning value or various correction values, to the feedback control amount, there may be a possibility that an actual air-fuel ratio is changed due to a variation in the offset correction amount even if the feedback control amount is constant.

Consequently, an error is caused between a predicted air-fuel ratio and the actual air-fuel ratio only by predicting the air-fuel ratio after the lapse of waste time using the feedback control amount, thereby causing a problem in that the waste time compensation control cannot be maintained at high accuracy.

SUMMARY OF THE INVENTION

The present invention has been accomplished in view of the above problems and has an object to improve air-fuel ratio control performance in an air-fuel ratio control of an internal combustion engine adopted with a self-tuning control.

According to a first aspect of the present invention to achieve the above object, a basic constitution: to detect an actual air-fuel ratio by an air-fuel ratio sensor; to calculate a fuel injection quantity, using a feedback control amount based on the actual air-fuel ratio and a target air-fuel ratio, at a time when a feedback control is performed; and to inject fuel by a fuel injection valve based on an injection signal corresponding to the fuel injection quantity, to thereby control an air-fuel ratio, is added with a constitution described below:

to sequentially identify a plant model representing a plant between the fuel injection valve and the air-fuel ratio sensor, to calculate an input side parameter ($b_0$ described above corresponds to this parameter) and output side parameters ($a_1$ and $a_2$ described above correspond to these parameters) set, respectively, on an input side and an output side of the plant model;

to calculate a control gain using the calculated parameters (that is, the calculated input side parameter and output side parameters) directly, if an absolute value of the calculated input side parameter is a limit value or above, to calculate the feedback control amount using the control gain; and to calculate the control gain using the limit value instead of the calculated input side parameter (that is, using the calculated output side parameters and the limit value), if on the other hand, the absolute value of the calculated input side parameter is less than the limit value, to calculate the feedback control amount using the control gain.

A further object of the present invention is to predict an air-fuel ratio after the lapse of waste time with high accuracy, to calculate an accurate feedback control amount, in an air-fuel ratio control apparatus of an internal combustion engine, for calculating an air-fuel ratio feedback control amount while performing a waste time compensation control.

According to a second aspect of the present invention to achieve the above object, a basic constitution: to detect an actual air-fuel ratio by an air-fuel ratio sensor; to calculate a fuel injection quantity, using a feedback control amount based on the actual air-fuel ratio and a target air-fuel ratio, and an offset correction amount to the target air-fuel ratio; and to inject fuel by a fuel injection valve based on an injection signal corresponding to the fuel injection quantity, to thereby control an air-fuel ratio, is added with a constitution described below:

to use a plant model representing a plant between the fuel injection valve and the air-fuel ratio sensor, to calculate a predicted air-fuel ratio after the lapse of waste time included in the plant;

to calculate the feedback control amount, while performing a waste time compensation for eliminating an affect of the waste time using the predicted air-fuel ratio;

to set the offset correction amount; and to calculate the predicted air-fuel ratio by setting a value obtained by adding the offset correction amount to the feedback control amount as a plant input.

These and other objects and features of the present invention will become understood from the following description with reference to the accompanying drawings.

DETAILED DESCRIPTION OF THE PREFERRED EMBODIMENT

Embodiments of the present invention will be described based on the appended drawings.

Figure 1:
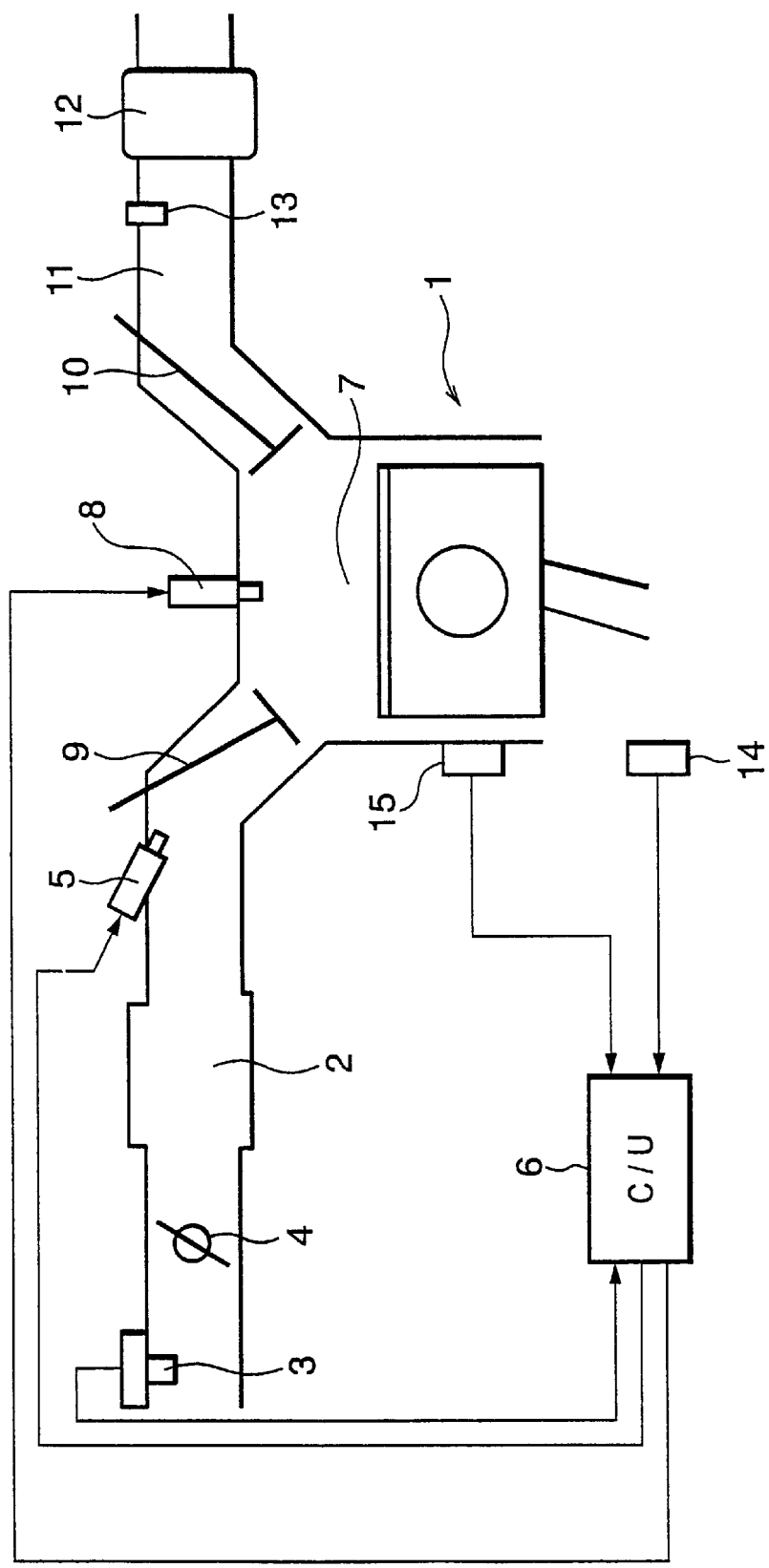
FIG. 1 is a system diagram showing an internal combustion engine common to embodiments of the present invention.

As shown in FIG. 1, an airflow meter 3 detecting an intake air amount Qa and a throttle valve 4 controlling the intake air amount Qa are provided to an intake passage 2 of an engine 1.

Further, a fuel injection valve 5 provided to intake passage 2 is driven to open by an injection signal from a control unit (C/U) 6 incorporating a microcomputer, to inject and supply fuel.

In each cylinder, an ignition plug 8 performing spark ignition within a combustion chamber 7 is disposed, to ignite an air-fuel mixture sucked in through an intake valve 9 by spark ignition.

Combustion exhaust is discharged via an exhaust valve 10 into an exhaust passage 11, and discharged to the atmosphere through an exhaust purifying apparatus 12.

A wide range air-fuel ratio sensor 13 detecting an air-fuel ratio linearly according to oxygen concentration within the exhaust is provided upstream of exhaust purifying apparatus 12 in exhaust passage 11.

Further, there are provided a crank angle sensor 14 outputting a crank angle signal at each predetermined crank angle of engine 1, and a water temperature sensor 15 detecting a cooling water temperature Tw within a cooling jacket of engine 1.

Control unit (C/U) 6 controls fuel injection valve 5 in the following manner.

First, a basic fuel injection quantity $Tp = K \times Qa \times Ne$ (wherein K is constant) corresponding to a stoichiometric air-fuel ratio ($\lambda=1$) is calculated from the intake air amount Qa and an engine rotation speed Ne detected based on the signal from crank angle sensor 14.

Next, it is judged whether the air-fuel ratio is to be feedback controlled or open-loop controlled, according to operating conditions. When the air-fuel ratio is to be feedback controlled, a final fuel injection quantity $Ti = Tp \times (1/\lambda t) \times \alpha$ is calculated using the basic fuel injection quantity Tp, a target air-fuel ratio $\lambda t$, and also an air-fuel ratio feedback correction coefficient $\alpha$ calculated based on the detection signal from air-fuel ratio sensor 13.

In the case where the air-fuel ratio is to be open-loop controlled, the air-fuel ratio feedback correction coefficient $\alpha$ is fixed to 1 ($\alpha=1$), to calculate the final fuel injection quantity Ti.

Then, an injection signal corresponding to the final fuel injection quantity Ti is output to fuel injection valve 5.

Now, a fuel injection control in a first embodiment will be described.

Figure 2:
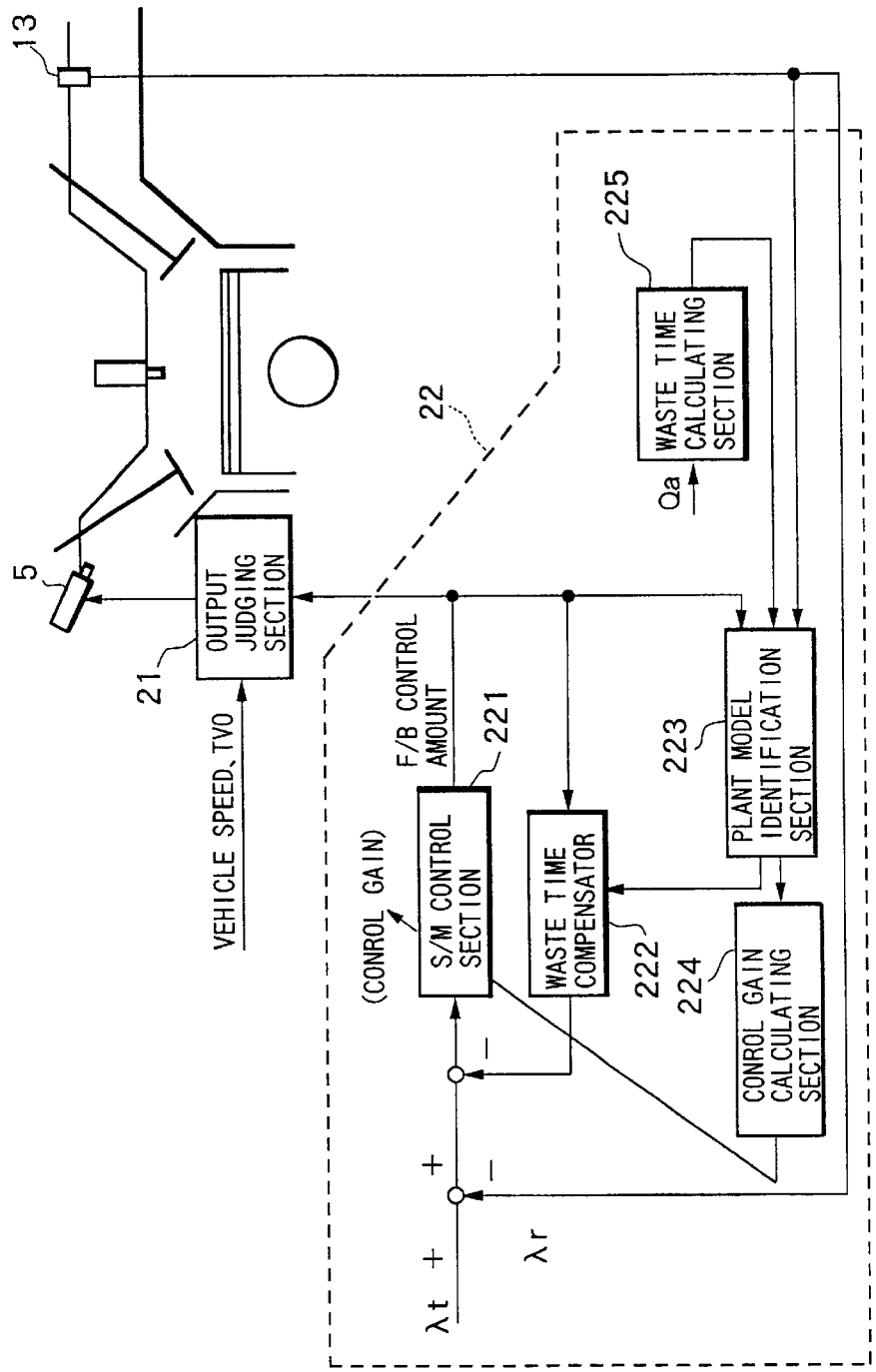
FIG. 2 is a block diagram showing an air-fuel ratio control (fuel injection control) of the internal combustion engine in a first embodiment.

As shown in FIG. 2, a fuel injection control section in the present embodiment comprises an output judging section 21 judging an output to fuel injection valve 5, and an air-fuel ratio feedback control section 22 shown by dashed lines in the figure.

Output judging section 21 judges whether or not a feedback correction amount calculated by air-fuel ratio feedback control section 22 is to be to output to fuel injection valve 5, according to operating conditions. When the feedback control amount is not to be output, then a clamp value (1 at the time when the open-loop control is performed, 0 at a time when fuel is cut off) is output as the feedback control amount.

Air-fuel ratio feedback control section 22 comprises a sliding mode control section (S/M control section) 221, a waste time compensator 222, a plant model identification section 223, a control gain calculating section 224, and a waste time calculating section 225.

S/M control section 221 calculates a control amount u(t) for a plant (between fuel injection valve 5 and air-fuel ratio sensor 13), in other words, the feedback control amount of fuel injection valve 5 (air-fuel ratio feedback correction coefficient $\alpha$), according to the following equation (1), by the sliding mode control, based on a deviation between the target air-fuel ratio $\lambda t$ and the actual air-fuel ratio $\lambda t$.

$$u(t) = K_P \cdot e(t) + K_D \cdot \Delta e(t) + K_I \cdot \sum \sigma(t) + K_N \cdot \frac{\sigma(t)}{|\sigma(t)|} \qquad (1)$$

wherein e(t) is an input to S/M control section 221 (target air-fuel ratio−actual air-fuel ratio), $K_P$ is a linear term linear gain, $K_D$ is a linear term derivative gain, $S_p$ is a switching function linear gain, $S_D$ is a switching function derivative gain, $K_I$ is an adaptive law gain, $K_N$ is a nonlinear gain, and σ(t) is a switching function, wherein σ(t)=$S_P$e(t)+$S_D$e(t). Note, each control gain is calculated at control gain calculating section 224 mentioned later.

Waste time compensator 222 is for executing a waste time compensation control by a Smith method, and compensates for an influence of waste time (that is, a phase delay of detected air-fuel ratio) included in the plant by performing a local feedback.

Figure 3:
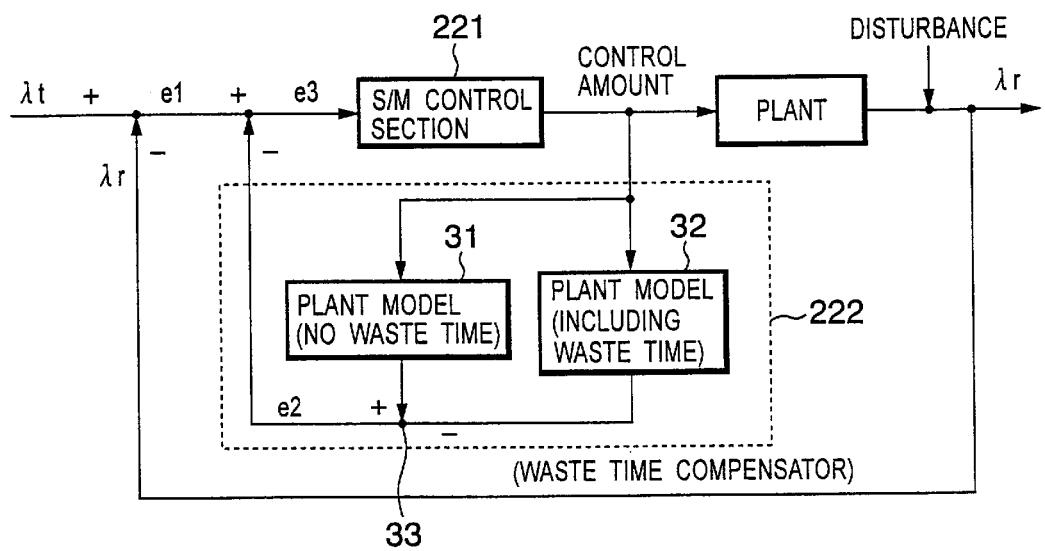
FIG. 3 is a block diagram showing a waste time compensation control used in the first embodiment.

Specifically, as shown in FIG. 3, waste time compensator 222 comprising a plant model 31 including no waste time, a plant model 32 including waste time and a subtraction section 33, calculates a deviation e2 between an output (air-fuel ratio) prediction calculated at plant model 31 including no waste time element and an actual output (actual air-fuel ratio) prediction calculated at plant model 32 including waste time, to output the deviation e2 to an input side of S/M control section 221.

Then, e3 is calculated by subtracting e2 output from waste time compensator 222 from a deviation e1 between the target air-fuel ratio λt and the actual air-fuel ratio λr, to be input to S/M control section 221, so as to eliminate waste time components of the plant, included in the deviation e1 between the target air-fuel ratio λt and the actual air-fuel ratio λr.

The above plant model is identified at plant model identification section 223 described later, and the waste time k is calculated at waste time calculating section 225 also described later.

Plant model identification section 223 sequentially identifies on-line the plant model representing the plant by a transfer function based on the fuel injection quantity (fuel injection signal) and the actual air-fuel ratio (output). Specifically, a recursive least squares method (RLS method) is used to calculate a plant model parameter.

Control gain calculating section 224 calculates the control gain of S/M control section 221 using the parameter calculated by plant model identification section 223.

Specifically, the self-tuning control by a pole assignment method is used to represent, by a closed-loop transfer function, an entire system (in other words, plant (between fuel injection valve 5 and air-fuel ratio sensor 13)+S/M control section 221+waste time compensator 222), to calculate the control gain of S/M control section 221 so that a pole of the closed-loop transfer function is coincident with a desirable pole from the point of view of response characteristic, overshoot, stabilization period, and so on (details of which will be described later).

Figure 4:
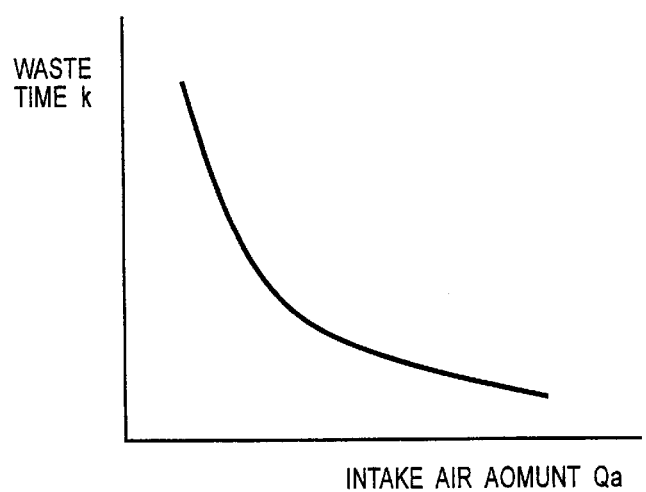
FIG. 4 is a table for calculating a waste time used in the first embodiment.

Waste time calculating section 225 calculates the waste time k included in the plant. Such calculation of waste time k is performed, for example, by preparing in advance a table illustrating a relation between the intake air amount Qa and the waste time k, as shown in FIG. 4, and by retrieving the table based on the detected intake air amount Qa.

Now, the calculation of the control gain performed at control gain calculating section 224 will be described in detail. The control gain calculation using the self-tuning control by the pole assignment method is performed as follows.

First, a plant model $G_P(z^{-1})$ representing the plant by the transfer function is set. Thereafter, a transfer function $G_C(z^{-1})$ of S/M control section 221 and a transfer function $G_L(z^{-1})$ of waste time compensator 222 are obtained. Then, based on these transfer functions, a closed-loop transfer function $W(z^{-1})$ of the entire system is calculated, and the control gain is calculated so that a pole of the closed-loop transfer function becomes a set pole.

(A) Setting of Plant Model

The plant between fuel injection valve 5 and air-fuel ratio sensor 13 is expressed by a quadratic ARX model $A(z^{-1})$, for example, as in the following equations (2) and (3), using the waste time k (≥1) calculated at waste time calculating section 225.

$$A(z^{-1})y(t) = z^{-k}b_0 u(t) + \epsilon(t) \qquad (2)$$

$$A(z^{-1}) = 1 + a_1 z^{-1} + a_2 z^{-2} \qquad (3)$$

wherein y(t) is a plant output (that is, actual air-fuel ratio), u(t) is a plant input value (that is, fuel injection quantity), and ε(t) is a random noise. Note, in the plant model (equations (1) and (2)), a parameter $b_0$ set on the plant input u(t) side is "an input side parameter", and parameters $a_1$ and $a_2$ set on the plant output y(t) side are "output side parameters".

Then, the transfer function $G_P(z^{-1})$ of the plant model can be expressed by the following equation (4).

$$G_P(z^{-1}) = z^{-k} b_0 / A(z^{-1}) \qquad (4)$$

Further, an estimation parameter vector θ(t) and a data vector ψ(t−k) can be expressed by the following equations (5) and (6).

$$\theta(t) = [a_1(t), a_2(t), b_0(t)]^T \qquad (5)$$

$$\psi(t-k) = [-y(t-1), -y(t-2), u(t-k)]^T \qquad (6)$$

(B) Identification (Parameter Estimation) of Plant Model

The set plant model is identified at plant model identification section 223.

Specifically, a characteristic of the plant is changed according to operating conditions and plant characteristics such as the degradation of the plant itself, so the plant model is identified (by online identification) by sequentially estimating output side parameters $a_1(t)$, $a_2(t)$ and an input side parameter $b_0(t)$ shown in the equation (5).

Further, in the present embodiment, the recursive least squares method (RLS method) is used to calculate the above parameters, and parameters in which the square of an error between an actual value and a calculated value becomes minimum are sequentially calculated. A specific calculation is the same as a general weighted recursive least squares method (RLS method), and is performed by calculating the following equations (7) through (9) with respect to a time update equation; t=1, 2, . . . , N.

$$\hat{\theta}(t) = \hat{\theta}(t-1) + \frac{P(t-1)\psi(t-k)}{1 + \psi^T(t-k)P(t-1)\psi(t-k)} \varepsilon(t) \qquad (7)$$

$$\varepsilon(t) = y(t) - \psi^T(t-k)\hat{\theta}(t-1) \qquad (8)$$

$$P(t) = \frac{1}{\lambda_1}\left[P(t-1) - \frac{\lambda_2 P(t-1)\psi(t-k)\psi^T(t-k)P(t-1)}{\lambda_1 + \lambda_2 \psi(t)\psi^T(t-k)P(t-1)\psi(t-k)}\right] \qquad (9)$$

wherein $\hat{\theta}(t)$: parameter estimation value (parameter prediction value)

$\epsilon(t)$: prediction error (actual value–prediction value)

P(t): m×m matrix constituted of input/output (covariance matrix)

$\psi(t)$: input/output value (data vector)

$\lambda_1, \lambda_2$: forgetting coefficient, moreover, an initial value of parameter estimation: $\hat{\theta}(0)=\theta 0$ an initial value of covariance matrix $P(0)=\alpha \cdot I$ wherein $\alpha=1000$ (I represents unit matrix).

Then, by sequentially estimating the output side parameters $a_1(t)$, $a_2(t)$, and the input side parameter $b_0(t)$ using the parameter estimation equations (7) through (9), the plant model is identified.

Note, as for forgetting coefficients $\lambda_1$, $\lambda_2$, when there exists no forgetting element, $\lambda_1=\lambda_2=1$, while when there exists a forgetting element, $\lambda_1=0.98$ and $\lambda_2=1$. Moreover, in the present embodiment, as the initial value $\theta 0$ of the parameter estimation value, an initial value preset according to operating conditions (for example, $a_1(0)=A1$, $a_2(0)=A2$, and $b_0(0)=B1$) is set, so as to shorten a time until convergence.

(C) Calculation of a Discrete Time Transfer Function of S/M Control Section 221

S/M control section 221 is made to be a transfer function according to the following procedure.

It is assumed that y(t) is a plant output (actual air-fuel ratio $\lambda r$), $\omega(t)$ is a target value (target air-fuel ratio $\lambda t$), and $e(t)=\omega(t)-y(t)$, a difference $\Delta u(t)$ of the plant input u(t) of one sample (in other words, the output from S/M control section 221) can be calculated by the following equation (10).

$$\Delta u(t) = u(t) - u(t-1) = \underbrace{K_P \Delta e(t) + K_D \Delta \{\Delta e(t)\}}_{\text{(linear term deviation)}} + \qquad (10)$$

$$\underbrace{K_i \underbrace{\{S_P e(t) + S_D \Delta e(t)\}}_{\text{(adaptive law)}}}_{\text{(switching function)}} + \underbrace{K_N \frac{\sigma(t)}{|\sigma(t)|}}_{\text{(nonlinear term deviation)}} =$$

$$K_P\{e(t) - e(t-1)\} + K_D\{e(t) - e(t-1)\}^2 + K_I S_P e(t) +$$

$$K_I S_D\{e(t) - e(t-1)\} + K_N\left(\frac{\sigma(t)}{|\sigma(t)|} - \frac{\sigma(t-1)}{|\sigma(t-1)|}\right)$$

wherein $e(t)=\omega(t)-y(t)$, $e(t)-e(t-1)=\Delta e(t)$, so the following equation (11) is obtained from the equation (10).

$$(1-z^{-1})u(t) = K(z^{-1})\{\omega(t) - y(t)\} + K_N(1-z^{-1})\frac{\sigma(t)}{|\sigma(t)|} \qquad (11)$$

where $K(z^{-1})$ is represented by the following equation (12), which is expanded as the equation (13) to be calculated based on each control gain.

$$K(z^{-1}) = K_P(1-z^{-1}) + K_D(1-z^{-1})^2 + K_I S_P + K_I S_D(1-z^{-1}) \qquad (12)$$

$$= (K_P + K_I S_P + K_I S_D + K_D) - (K_P + K_I S_D + 2K_D)z^{-1} + K_D z^{-2} \qquad (13)$$

Accordingly, from the equation (12), the plant input u(t) can be expressed by the following equation (14).

$$u(t) = \frac{K(z^{-1})}{1-z^{-1}}\{\omega(t) - y(t)\} + K_N(1-z^{-1})\frac{\sigma(t)}{|\sigma(t)|} \qquad (14)$$

Here, if the calculation is performed so as not to include the nonlinear term, the discrete time transfer function $G_C(z^{-1})$ of S/M control section 221 can be expressed by the following equation (15).

$$G_C(z^{-1}) = K(z^{-1})/(1-z^{-1}) \qquad (15)$$

(D) Calculation of a Discrete Time Transfer Function of Waste Time Compensator 222

As described above, waste time compensator 222 uses the Smith method that compensates for the influence of waste time element while performing the output prediction after waste time, so a discrete time transfer function $G_L(z^{-1})$ of waste time compensator 222 can be calculated by the following equation (16).

$$G_L(z^{-1}) = z^{-1}b_0/A(z^{-1}) - z^{-k}b_0/A(z^{-1}) = (z^{-1} - z^{-k})b_0/A(z^{-1}) \qquad (16)$$

Note, $z^{-1}b_0/A(z^{-1})$ is an output prediction including no waste time expressed using the plant model, and $z^{-k}b_0/A(z^{-1})$ is an actual output prediction including waste time expressed using the plant mode.

Figure 5:
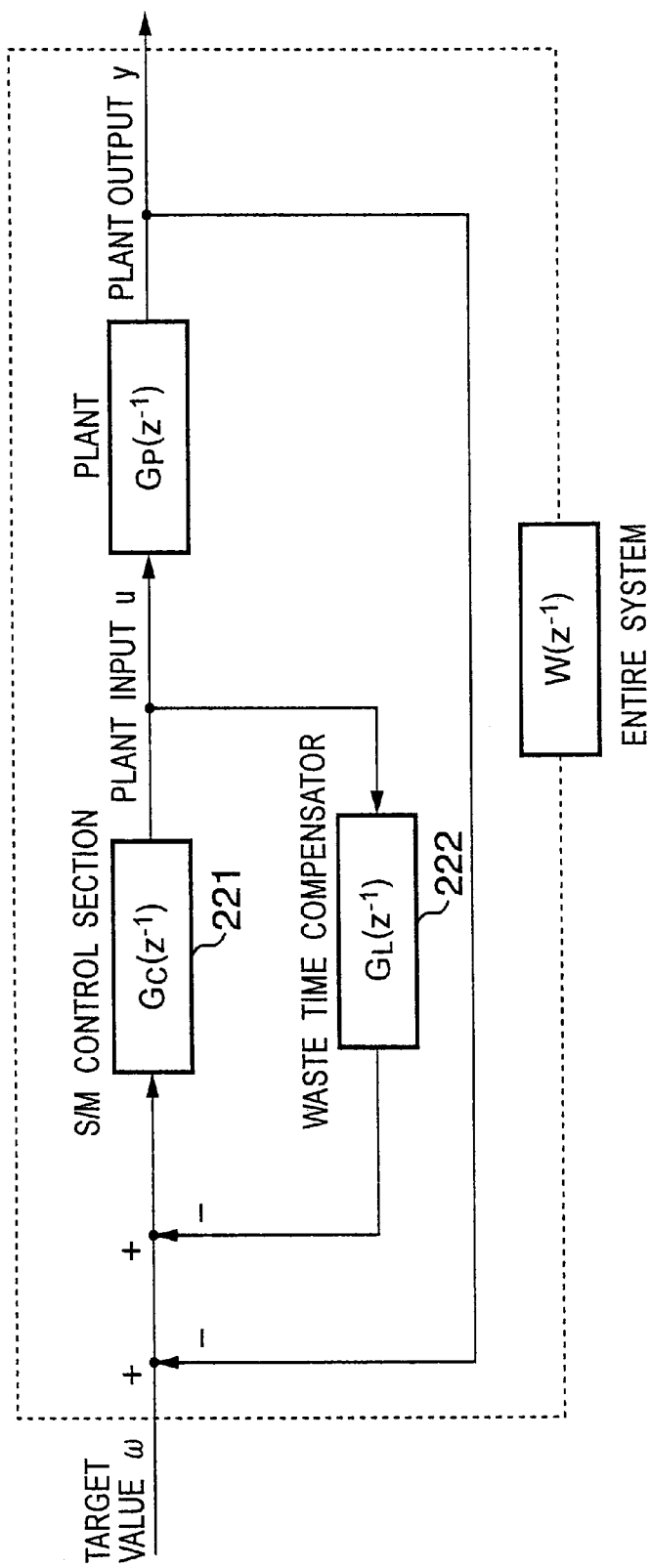
FIG. 5 is a block diagram representing, by transfer functions, an S/M control section 221 and waste time compensator 222 in the first embodiment.

FIG. 5 is a block diagram using the respective transfer functions (plant model, S/M control section 21, waste time compensator) calculated as described above.

Next, there will be described a method of making the entire system to be a closed-loop transfer function.

As described above, the nonlinear term of S/M control section 221 is not included.

(E) Calculation of a Closed-loop Transfer Function $W(z^{-1})$ of the Entire System At first, a feedback loop of S/M control section 221 and waste time compensator 222 is taken out to calculate one transfer function from a target (target air-fuel ratio $\lambda t$) to an output (feedback control amount). In FIG. 5, a transfer function $G_{CL}(z^{-1})$ of the local loop including S/M control section 221 and waste time compensator 222 can be calculated as the following equation (17) based on the equations (15) and (16).

$$G_{CL}(z^{-1}) = \frac{G_C(z^{-1})}{1 + G_L(z^{-1}) \cdot G_C(z^{-1})} = \frac{\frac{K(z^{-1})}{1-z^{-1}}}{1 + G_L(z^{-1}) \cdot \frac{K(z^{-1})}{1-z^{-1}}} \qquad (17)$$

$$= \frac{K(z^{-1})}{(1-z^{-1}) + G_L(z^{-1})K(z^{-1})}$$

Accordingly, the closed-loop transfer function $W(z^{-1})$ of the entire system including the local loop shown in equation (17) and the plant can be calculated by the following equation (18).

$$W(z) = \frac{G_{CL}(z^{-1}) \cdot \frac{z^{-k}b_0}{A(z^{-1})}}{1 + G_{CL}(z^{-1}) \cdot \frac{z^{-k}b_0}{A(z^{-1})}} \qquad (18)$$

$$= \frac{K(z^{-1})z^{-k}b_0}{\{(1-z) + G_L(z^{-1})K(z^{-1})\} \cdot A(z^{-1}) + K(z^{-1})z^{-k}b_0}$$

$$= \frac{K(z^{-1})z^{-k}b_0}{(1-z^{-1})A(z^{-1}) + K(z^{-1})\{z^{-1}b_0 - z^{-k}b_0\} + K(z^{-1})z^{-k}b_0}$$

-continued $$= \frac{K(z^{-1})z^{-k}b_0}{(1-z^{-1})A(z^{-1})+z^{-1}b_0K(z^{-1})}$$

Figure 6:
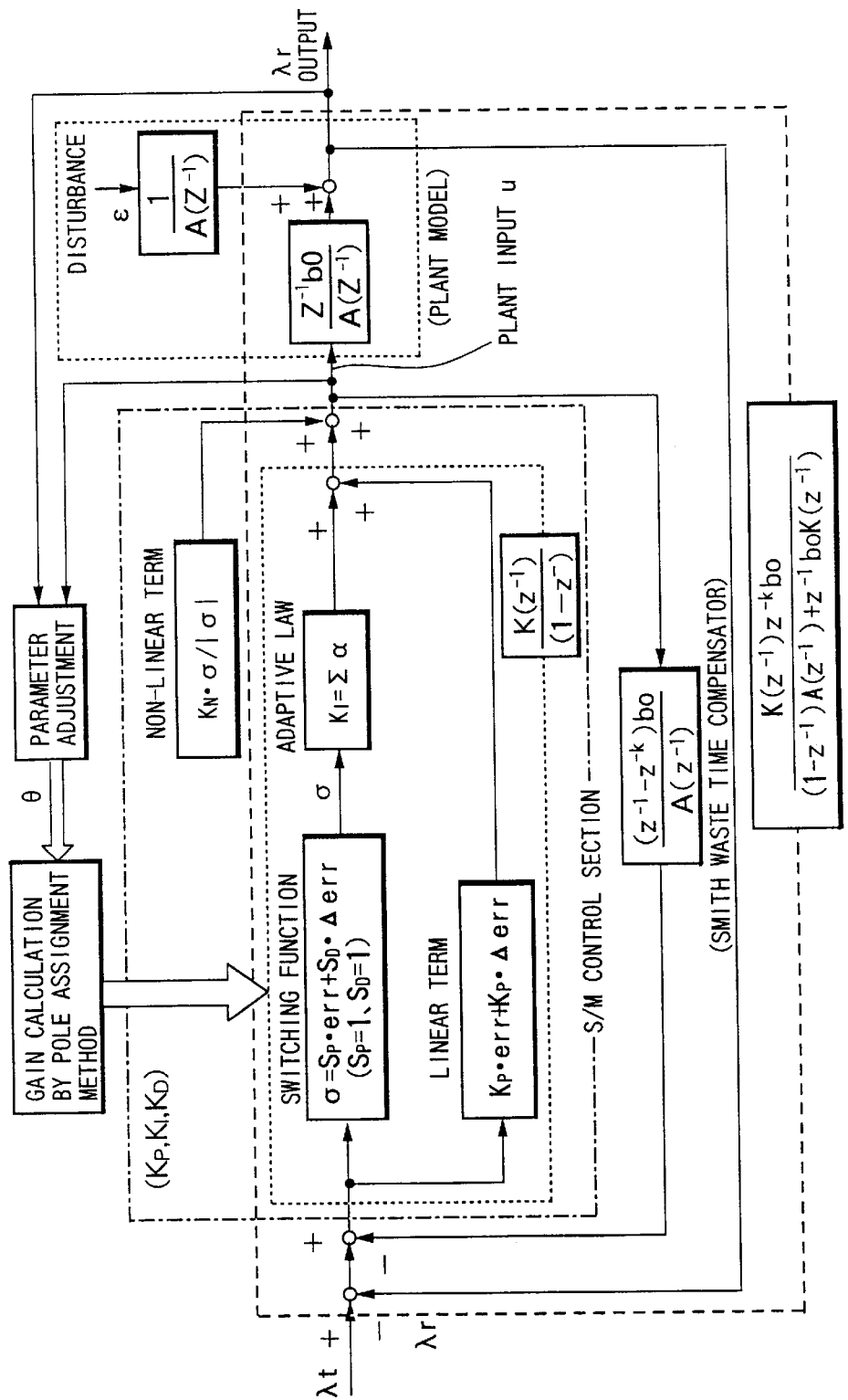
FIG. 6 is a block diagram showing an overall air-fuel ratio feedback control by a sliding mode control using a self-tuning control in the first embodiment.

FIG. 6 is a block diagram showing the result of the above calculation.

(F) Calculation of the Control Gain of S/M Control Section 222 by the Pole Assignment Method From the equation (18), the characteristic polynomial of closed-loop transfer function $W(z^{-1})$ is:

$$(1-z^{-1})A(z^{-1})+z^{-1}b_0K(z^{-1}),$$

and the above is adopted in the following equation (19).

$$(1-z^{-1})A(z^{-1})+z^{-1}b_0K(z^{-1})=T(z^{-1})=1+t_1z^{-1}+t_2z^{-2} \quad (19)$$

At this time, by setting $T(z^{-1})$ to achieve the desired pole from the point of view of response characteristic, overshoot, stabilization period, and so on, the control gain of S/M control section 221 is calculated as follows.

The following equation (20) is obtained from the equation (19).

$$K(z) = \frac{1+t_1z^{-1}+t_2z^{-2}-(1-z^{-1})A(z^{-1})}{z^{-1}b_0} \quad (20)$$

$$= \frac{1+t_1z^{-1}+t_2z^{-1}-\{1+(a_1-1)z^{-1}+(a_2-a_1)z^{-2}-a_2z^{-3}\}}{z^{-1}b_0}$$

$$= \frac{(t_1-a_1+1)+(t_2-a_2+a_1)z^{-1}+a_2z^{-2}}{b_0}$$

Here, based on the equation (13), $$K(z^{-1})=(K_P+K_I'S_P+K_I'S_D+K_D)-(K_P+K_I'S_D+2K_D)z^{-1}+K_Dz^{-2}.$$

So, by setting the switching function linear gain $S_P$ and switching function derivative gain $S_D$ to 1, and setting the linear term linear gain $K_P$, adaptive law gain $K_I$ and linear term derivative gain $K_D$ as variable parameters, the following equation (21) can be obtained.

$$(K_P+SK_I+K_D)-(K_P+K_L+2K_D)z^{-1}+K_Dz^{-2} = \quad (21)$$

$$\frac{(t_1-a_1+1)+(t_2-a_2+a_1)z^{-1}+a_2z^{-2}}{b_0}$$

Then, the following equations (22) through (24) are obtained.

$$(K_P+2K_I+K_D) = \frac{t_1-a_1+1}{b_0} \quad (22)$$

$$-(K_P+K_I+2K_D) = \frac{t_1-a_2+a_1}{b_0} \quad (23)$$

$$K_D = \frac{a_2}{b_0} \quad (24)$$

Therefore, by solving the equations (22) through (24) for $K_P$, $K_I$ and $K_D$, respectively, to express by $a_1$, $a_2$ and $b_0$, respectively, each gain can be calculated by the following equations (25) through (27), respectively.

$$K_P = \frac{1+t_1+2t_2+a_1+a_2}{b_0} \quad (25)$$

$$K_I = \frac{1+t_1+t_2}{b_0} \quad (26)$$

$$K_D = \frac{a_2}{b_0} \quad (27)$$

Further, for the characteristic polynomial $T(z^{-1})=1+t_1z^{-1}+t_2z^{-2}$, it is possible to consider the use of the denominator of the transfer function of when the quadratic continuous time system $$G(s)=\omega^2/(s^2+2\zeta\omega s+\omega^2)$$

is made to be discrete by a sample time Ti, wherein attenuation $\zeta=0.7$ and natural angular frequency $\omega=30$.

Then, by substituting the estimated parameters $a_1(t)$, $a_2(t)$ and $b_0(t)$ sequentially estimated at plant model identification section 223 for $a_1$, $a_2$ and $b_0$ of the equations (25) to (27), the control gains are calculated.

As shown in the equations (25) to (27), the respective gains ($K_P$, $K_I$ and $K_D$) are calculated by divided by the intake side parameter $b_0$.

Accordingly, the smaller an absolute value of the estimated input side parameter $b_0(t)$ becomes, the larger the respective control gains become.

Then, if the absolute value of the estimated input side parameter $b_0(t)$ is less than a fixed value, the calculated respective control gains are excessive (accompanying with this, the feedback control amount is also excessive), leading a possibility of control divergence.

Therefore, in the present embodiment, the estimated value of the input side parameter $b_0(t)$ is limited so that the absolute value $|b_0(t)|$ thereof becomes a predetermined limit value bs or above, to ensure the stability of control.

Specifically, if the absolute value $|b_0(t)|$ of the estimated input side parameter $b_0(t)$ is the limit value bs or above, the control gains are calculated using the estimated input side parameter. On the other hand, if the absolute value $|b_0(t)|$ of the estimated input side parameter $b_0(t)$ is less than the limit value bs, that is $-bs<b_0(t)<bs$, the control gains are calculated using the limit value $-bs$ or bs instead of the estimated input side parameter $b_0(t)$.

Note, in the present embodiment, 0.05 determined in experimental is used as the limit value bs.

Therefore, the calculation of the control gains is performed using the following equations (28) to (30).

$$K_P = \frac{1+t_1+2t_2+a_1(t)+a_2(t)}{b_0} \quad (28)$$

$$K_I = \frac{1+t_1+t_2}{b_0} \quad (29)$$

$$K_D = \frac{a_2(t)}{b_0} \quad (30)$$

wherein $b_0=b_0(t)$ ($b_0(t)\leq-0.05$, $0.05\leq b_0(t)$)
$b_0=0.05$ ($0<b_0(t)<0.05$)
$b_0=-0.05$ ($-0.05<b_0(t)<0$).

Then, by using the calculated control gains, S/M control section 221 calculates the feedback control amount u(t).

As described above, the entire system is expressed with a single transfer function using the plant model obtained by sequentially estimating parameters, and the control gain of S/M control section 221 calculating the feedback control amount for the plant is obtained so that the pole of the transfer function is coincident with the desirable pole from the point of view of response characteristic, overshoot, stabilization period and so on. Thus, a good control gain corresponding well to the characteristic change of the plant can be calculated, and as a result, an accurate air-fuel ratio feedback control can be executed.

Particularly, in the present embodiment, the control gains are calculated based on the estimated output side parameters $a_1(t)$, $a_2(t)$ and the limit value bs (=0.05 or −0.05), if the absolute value of the input side parameter $b_0(t)$ estimated at plant model identification section 223 is less than the set limit value bs (0.05 in the present embodiment). Thus, it is possible to reliably avoid such a situation where the control gains become excessive and accompanying with this, the calculated feedback control amount becomes excessive, leading the control divergence.

Next, a second embodiment according to the present invention will be described.

In the present embodiment, similarly to the general air-fuel ratio feedback control, a deviation of the feedback control amount from a reference value caused by degradation with time of parts and the like is learned and also a water temperature based correction is performed to set a control amount of fuel injection valve 5. In the case where the air-fuel ratio feedback control is performed, control unit (C/U) 6 calculates the final fuel injection quantity Ti=Tp×$(1/\lambda t)$×$(\alpha+UL+UK)$ using the air-fuel ratio feedback correction coefficient $\alpha$, an air-fuel ratio learning value UL and various coefficients UK, calculated based on the basic fuel injection quantity Tp, the target air-fuel ratio $\lambda t$, and the detection signal from air-fuel ratio sensor 13.

Figure 7:
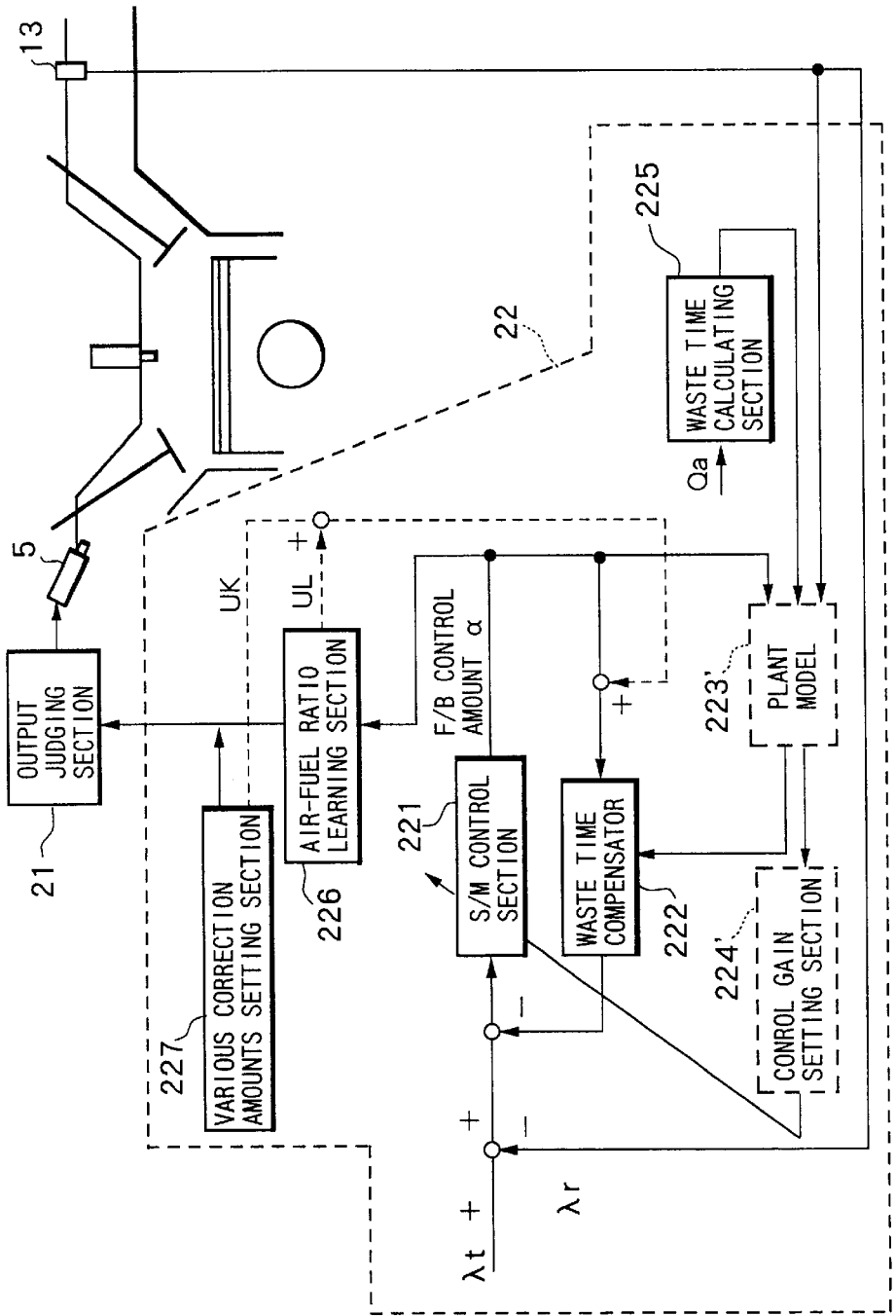
FIG. 7 is a block diagram showing an air-fuel ratio control (fuel injection control) of the internal combustion engine in a second embodiment.
Figure 8:
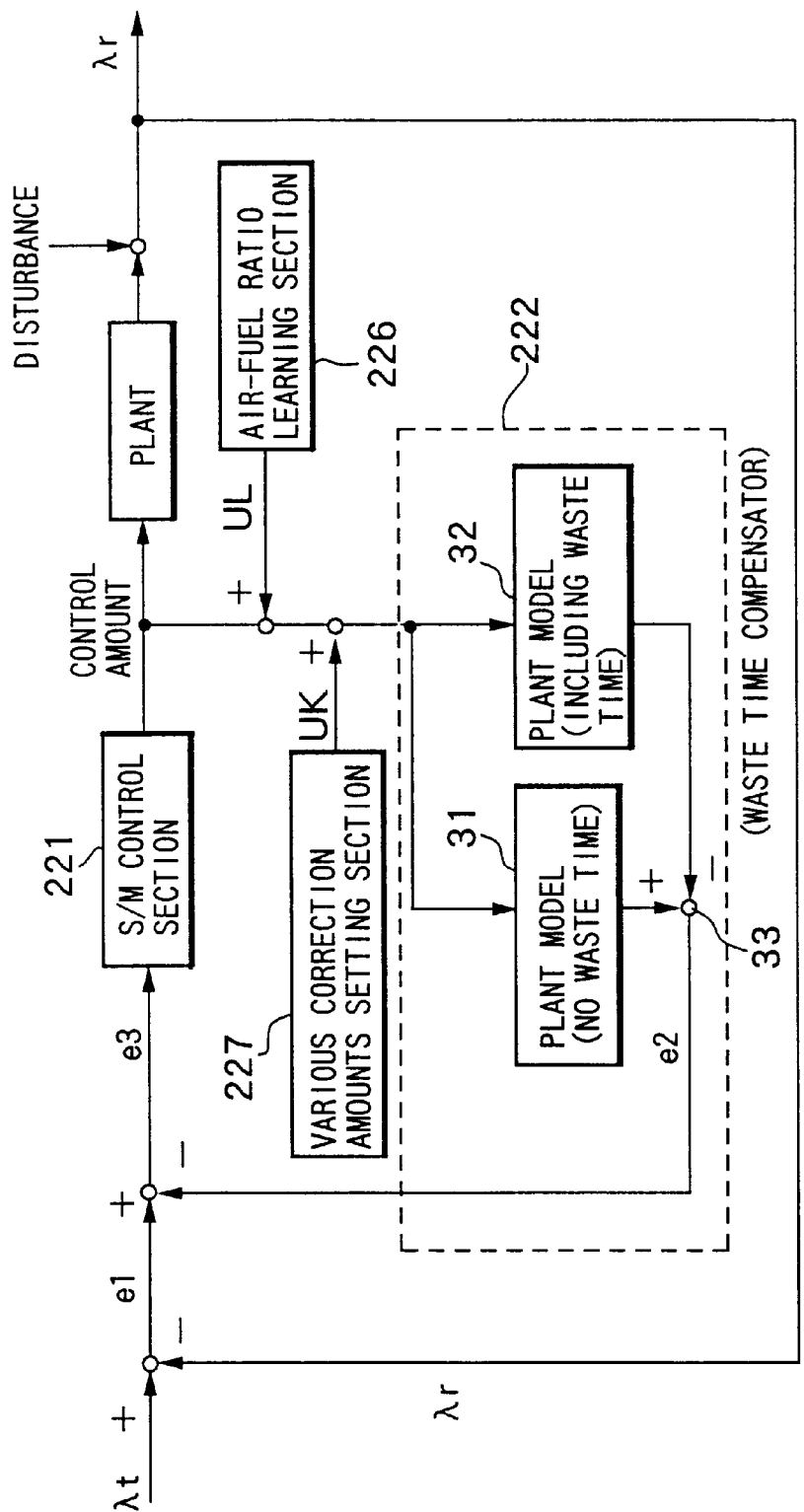
FIG. 8 is a block diagram showing a waste time compensation control used in the second embodiment.

FIG. 7 shows a fuel injection control section in the second embodiment. As shown in FIG. 7, in the present embodiment, air-fuel ratio feedback control section 22 comprises an air-fuel ratio learning section 226 and a various correction amounts setting section 227 (the components denoted by the same numeral references are the same as those in the first embodiment and the description thereof is omitted).

In FIG. 7 showing the present embodiment, the reason why a plant model setting section 223' is provided instead of plant model identification section 223 in the first embodiment (FIG. 2) is that the present embodiment includes not only the case where the plant model sequentially identified as in the first embodiment is used, but also the case where the plant model is set by another method (for example, the case where the plant model is previously set according to operating conditions).

Similarly, the reason why a control gain setting section 224' is provided instead of control gain calculating section 224 is that the present embodiment includes not only the case where the control gain to be used at S/M control section 221 by the self-tuning control by the pole assignment method is calculated, but also the case where the control gain is set by another method (for example, the case where the control gain is set according to operating conditions).

Air-fuel ratio learning section 226 learns the deviation between the feedback control amount and the reference value caused by degradation or variations of parts of the air-fuel ratio control system. Specifically, a deviation $\Delta\alpha$ between the reference value ($\alpha 0$=1) and a value obtained by weighted averaging values resulted from a plurality of samplings of the feedback control amount u(t) being the air-fuel ratio feedback correction coefficient $\alpha$ is calculated, and a predetermined ratio of deviation $\Delta\alpha(<1)$ is calculated as a learning value UL, to be stored and updated.

Various correction amounts setting section 227 sets various correction amounts UK such as a water temperature correction coefficient based on a detected water temperature value.

The learning value UL and the various correction amounts UK correspond to the offset correction amount.

Then, as a characteristic of the present embodiment, not the feedback control amount u(t) calculated by S/M control section 221 but the learning value UL and the various correction coefficients UK are added to the feedback correction amount, and the added value(=u(t)+UL+UK, to be referred to as a control amount after correction hereafter) is input to waste time compensator 222.

The reason why the control amount after correction is input to waste time compensator 222 is as follows.

That is, in the case where the air-fuel ratio learning value UL is switched or the various correction coefficients are changed, due to a change in operating region, even if the calculated feedback control amount is constant, the plant input is changed and the actual air-fuel ratio $\lambda r$ being the plant output is also changed.

Therefore, it is impossible to predict an output (air-fuel ratio) corresponding to an actual plant input only by calculating a predicted air-fuel ratio after the lapse of waste time based on the feedback control amount as in the general waste time compensation control, leading the reduction in accuracy of waste time compensation control.

As a result, since an appropriate feedback control amount cannot be calculated, the accuracy of air-fuel ratio feedback control is degraded (and, simultaneously with this, the identification accuracy of plant model is also degraded).

Therefore, in the present embodiment, the control amount after correction obtained by correcting the calculated feedback control amount u(t) with the air-fuel ratio learning value UL and various correction coefficients UK is input to waste time compensator 222.

Thus, it is possible to predict the output corresponding to the actual plant input, so that the air-fuel ratio after the lapse of waste time can be predicted accurately and also the accuracy of waste time compensation control can be improved to calculate the appropriate feedback control amount (note, as a result, the identification accuracy of plant model is also improved).

The entire contents of Japanese Patent Application No. 2001-384053 filed Dec. 18, 2001, and Japanese Patent Application No. 2001-401918 filed Dec. 28, 2001, priorities of which are claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. An air-fuel ratio control apparatus of an internal combustion engine, comprising:

a fuel injection valve driven based on an injection signal input thereto to inject fuel;

an air-fuel ratio sensor detecting an actual air-fuel ratio; and a control unit calculating a fuel injection quantity using a feedback control amount based on said actual air-fuel ratio and a target air-fuel ratio, to output an injection signal corresponding to said fuel injection quantity to said fuel injection valve, wherein said control unit:

sequentially identifies a plant model representing a plant between said fuel injection valve and said air-fuel ratio sensor, to calculate an input side parameter and output side parameters set, respectively, on an input side and an output side of said plant model;

calculates a control gain for calculating said feedback control amount using the calculated input side parameter and output side parameters, when an absolute value of the calculated input side parameter is a predetermined limit value or above;

calculates said control gain using said limit value and the calculated output side parameters, when the absolute value of the calculated input side parameter is less than said limit value; and calculates said feedback control amount using the calculated control gain.

2. An air-fuel ratio control apparatus of an internal combustion engine according to claim 1, wherein said control gain is calculated so that a transfer function representing the entire system inclusive of said plant has a predetermined characteristic.

3. An air-fuel ratio control apparatus of an internal combustion engine according to claim 1, wherein said plant model is a quadratic ARX model, and the parameters of said plant model are calculated using a recursive least squares method.

4. An air-fuel ratio control apparatus of an internal combustion engine according to claim 1, wherein said feedback control amount is calculated using said control gain by a sliding model control.

5. An air-fuel ratio control apparatus of an internal combustion engine according to claim 1, wherein said feedback control amount is calculated by performing a waste time compensation for eliminating an affect of waste time included in the plant using said plant model.

6. An air-fuel ratio control apparatus of an internal combustion engine, comprising:

a fuel injection valve driven based on an injection signal input thereto to inject fuel;

an air-fuel ratio sensor detecting an actual air-fuel ratio;

identifying means for sequentially identifying a plant model representing a plant between said fuel injection valve and said air-fuel ratio sensor, to calculate an input side parameter and output side parameters set, respectively, on an input side and an output side of said plant model;

control gain calculating means for calculating a control gain for calculating a feedback control amount based on said actual air-fuel ratio and a target air-fuel ratio using the calculated input side parameter and output side parameters;

feedback control amount calculating means for calculating said feedback control amount using the calculated control gain; and output means for calculating a fuel injection quantity using said feedback control amount, to output an injection signal corresponding to said fuel injection quantity to said fuel injection valve, wherein said control gain calculating means limits an absolute value of the calculated input side parameter to be a predetermined limit value or above, and calculates said control gain using said limit value instead of the calculated input side parameter, when the absolute value of the calculated input side parameter is less than said limit value.

7. An air-fuel ratio control method of an internal combustion engine, comprising the steps of:

sequentially identifying a plant model representing a plant between a fuel injection valve driven based on an injection signal input thereto to inject fuel and an air-fuel ratio sensor detecting an actual air-fuel ratio, to calculate an input side parameter and output side parameters set, respectively, on an input side and an output side of said plant model;

calculating a control gain for calculating a feedback control amount based on said actual air-fuel ratio and a target air-fuel ratio using the calculated input side parameter and output side parameters, when an absolute value of the calculated input side parameter is a predetermined limit value or above;

calculating said control gain using said limit value and the calculated output side parameters, when the absolute value of the calculated input side parameter is less than said limit value;

calculating said feedback control amount using the calculated control gain; and calculating a fuel injection quantity using the calculated feedback control amount, to output an injection signal corresponding to said fuel injection quantity to said fuel injection valve.

8. An air-fuel ratio control method of an internal combustion engine according to claim 7, wherein said control gain is calculated so that a transfer function representing the entire system inclusive of said plant has a predetermined characteristic.

9. An air-fuel ratio control method of an internal combustion engine according to claim 7, wherein said plant model is a quadratic ARX model, and the parameters of said plant model are calculated using a recursive least squares method.

10. An air-fuel ratio control method of an internal combustion engine according to claim 7, wherein said feedback control amount is calculated using said control gain by a sliding model control.

11. An air-fuel ratio control method of an internal combustion engine according to claim 7, wherein said feedback control amount is calculated by performing a waste time compensation for eliminating an affect of waste time included in the plant using said plant model.

12. An air-fuel ratio control apparatus of an internal combustion engine, comprising:

a fuel injection valve driven based on an injection signal input thereto to inject fuel;

an air-fuel ratio sensor detecting an actual air-fuel ratio; and a control unit calculating a fuel injection quantity using a feedback control amount based on said actual air-fuel ratio and a target air-fuel ratio, and an offset correction amount to said target air-fuel ratio, to output an injection signal corresponding to said fuel injection quantity to said fuel injection valve, wherein said control unit:

uses a plant model representing a plant between said fuel injection valve and said air-fuel ratio sensor, to calculate a predicted air-fuel ratio after the lapse of waste time included in said plant;

calculates said feedback control amount, while performing a waste time compensation for eliminating an affect of said waste time using the calculated predicted air-fuel ratio;

sets said offset correction amount; and calculates said predicted air-fuel ratio by setting a value obtained by adding said offset correction amount to said feedback control amount as a plant input.

13. An air-fuel ratio control apparatus of an internal combustion engine according to claim 12, wherein said offset correction amount includes a learning value obtained by learning a deviation of said feedback control amount from a reference value.

14. An air-fuel ratio control apparatus of an internal combustion engine according to claim 12, wherein said offset correction amount includes various correction values for correcting a basic fuel injection quantity equivalent to the target air-fuel ratio according to operating conditions.

15. An air-fuel ratio control apparatus of an internal combustion engine according to claim 12, wherein said feedback control amount is calculated by a sliding mode control.

16. An air-fuel ratio control apparatus of an internal combustion engine according to claim 12, wherein said plant model is previously set according to operating conditions.

17. An air-fuel ratio control apparatus of an internal combustion engine according to claim 12, wherein said plant model is sequentially identified.

18. An air-fuel ratio control apparatus of an internal combustion engine, comprising:

a fuel injection valve driven based on an injection signal input thereto to inject fuel;

an air-fuel ratio sensor detecting an actual air-fuel ratio; and waste time compensating means for performing a waste time compensation, while using a plant model representing a plant between said fuel injection valve and said air-fuel ratio sensor, to calculate a predicted air-fuel ratio after the lapse of waste time included in said plant;

feedback control amount calculating means for calculating a feedback control amount based on said actual air-fuel ratio and a target air-fuel ratio under a condition where an affect of the waste time is eliminated by said waste time compensating means;

offset correction amount setting means for setting an offset correction amount to said target air-fuel ratio; and output means for calculating a fuel injection quantity using said feedback control amount and said offset correction amount, to output an injection signal corresponding to said fuel injection quantity to said fuel injection valve, wherein said waste time compensating means calculates said predicted air-fuel ratio after the lapse of the waste time by setting a value obtained by adding said offset correction amount to said feedback control amount as a plant input.

19. An air-fuel ratio control method of an internal combustion engine, comprising the steps of:

using a plant model representing a plant between a fuel injection valve driven based on an injection signal input thereto to inject fuel and an air-fuel ratio sensor detecting an actual air-fuel ratio, to calculate a predicted air-fuel ratio after the lapse of waste time included in said plant;

calculating a feedback control amount based on said actual air-fuel ratio and a target air-fuel ratio, while performing a waste time compensation for eliminating an affect of said waste time using the calculated predicted air-fuel ratio;

setting an offset correction amount to said target air-fuel ratio; and calculating said predicted air-fuel ratio by setting a value obtained by adding said offset correction amount to said feedback control amount as a plant input.

20. An air-fuel ratio control method of an internal combustion engine according to claim 19, wherein said offset correction amount includes a learning value obtained by learning a deviation of said feedback control amount from a reference value.

21. An air-fuel ratio control method of an internal combustion engine according to claim 19, wherein said offset correction amount includes various correction values for correcting a basic fuel injection quantity equivalent to the target air-fuel ratio according to operating conditions.

22. An air-fuel ratio control method of an internal combustion engine according to claim 19, wherein said feedback control amount is calculated by a sliding mode control.

23. An air-fuel ratio control method of an internal combustion engine according to claim 19, wherein said plant model is previously set according to operating conditions.

24. An air-fuel ratio control method of an internal combustion engine according to claim 19, wherein said plant model is sequentially identified.

* * * * *